(12) United States Patent
Tarrant

(10) Patent No.: US 10,014,747 B2
(45) Date of Patent: Jul. 3, 2018

(54) MAGNETICALLY LOADED COMPOSITE ROTOR AND METHODS OF MAKING THE SAME

(71) Applicant: GKN HYBRID POWER LTD., Redditch (GB)

(72) Inventor: Colin David Tarrant, Worcestershire (GB)

(73) Assignee: GKN HYBRID POWER LTD., Redditch (GB)

( * ) Notice: Subject to any disclaimer, the term of this patent is extended or adjusted under 35 U.S.C. 154(b) by 212 days.

(21) Appl. No.: 14/745,132

(22) PCT Filed: Dec. 13, 2013

(86) PCT No.: PCT/GB2013/053282
§ 371 (c)(1),
(2) Date: Jun. 19, 2015

(87) PCT Pub. No.: WO2014/096787
PCT Pub. Date: Jun. 26, 2014

(65) Prior Publication Data
US 2016/0197532 A1 Jul. 7, 2016

(30) Foreign Application Priority Data

Dec. 20, 2012 (GB) .................................. 1223001.7

(51) Int. Cl.
| | |
|---|---|
| *H02K 7/02* | (2006.01) |
| *H02K 1/27* | (2006.01) |
| *H02K 15/03* | (2006.01) |
| *F16F 15/305* | (2006.01) |

(52) U.S. Cl.
CPC ............. *H02K 7/02* (2013.01); *F16F 15/305* (2013.01); *H02K 1/2706* (2013.01); *H02K 1/2726* (2013.01); *H02K 1/2786* (2013.01); *H02K 15/03* (2013.01); *Y02E 60/16* (2013.01)

(58) Field of Classification Search
CPC ...... H02K 1/2706; H02K 7/02; H02K 1/2726; H02K 15/03; F16F 15/305; H05K 1/2786; Y02E 60/16
USPC .......................................................... 310/43
See application file for complete search history.

(56) References Cited

U.S. PATENT DOCUMENTS 6,490,990 B1 * 12/2002 Hamlyn ................ B29C 53/566
114/357
2010/0189916 A1 * 7/2010 Watanabe ............... B05C 5/002
427/512

FOREIGN PATENT DOCUMENTS

| EP | 0080860 A1 * | 6/1983 | ............ F16F 15/305 |
| EP | 1199493 A2 * | 4/2002 | ......... B29C 53/8041 |
| GB | 201210591 * | 8/2012 | ........... B29B 15/122 |
| JP | 2010159773 A * | 7/2010 | |

(Continued)

*Primary Examiner* — Forrest M Phillips
(74) *Attorney, Agent, or Firm* — Weiss & Moy, P.C.; Jeffrey D. Moy

(57) ABSTRACT

A magnetically loaded composite rotor is formed by providing a mandrel 1 having a longitudinal axis 2. A release agent 3 is coated on the mandrel and a fiber material 4 of woven or non-woven material having fibers extending in the direction of the axis 2 is applied over the release agent. A thermoplastic resin impregnated tow 24 including magnetic particles 28 is wound over the fiber material 4, the fiber material substantially preventing the magnetic particles penetrating through to the mandrel.

7 Claims, 3 Drawing Sheets

(56) References Cited

FOREIGN PATENT DOCUMENTS

Figure 1:
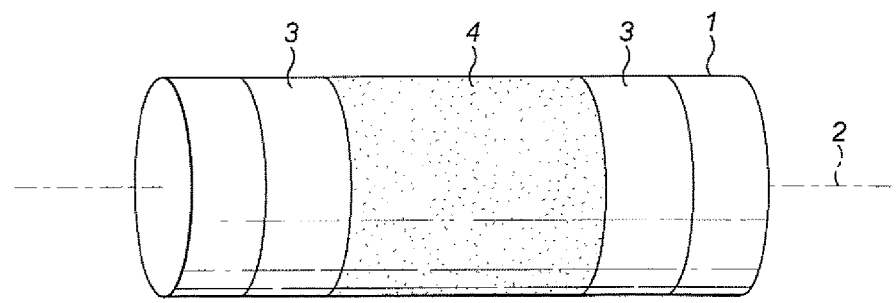

| WO | WO 9700549 A1 | * | 1/1997 | ............ F16F 15/305 |
| WO | WO 0201311 A1 | * | 1/2002 | ........... B29C 70/025 |

* cited by examiner

MAGNETICALLY LOADED COMPOSITE ROTOR AND METHODS OF MAKING THE SAME

This invention relates to a magnetically loaded composite (MLC) rotor and to methods of making such rotors.

MLC rotors, sometimes referred to as flywheels, may be used in electric motors/generators that are rotated at high speed, for example in excess of 30,000 rpm, to act as energy stores and/or motors.

The rotors are able to act as a motor or a generator in dependence upon whether energy is applied to, or extracted from, an electrical coil on a stator used in conjunction with the rotor.

The use of an MLC rotor has the advantage that discrete magnets, which would fly off at high speed, are not required.

Composite flywheels formed by using tows of fibres, i.e. an untwisted bundle of continuous filaments of man-made fibres, such as glass fibres, or carbon fibres, or carbon nanotubes, that are embedded in an uncured epoxy resin, e.g. epoxy resin, matrix are described in EP-B-067987 and PCT/GB2012/051367.

In EP-B-0667987, dry glass fibre tows, a slurry made up of powdered magnetic material, such as an isotropic NdFeB, and an uncured epoxy resin which may be a thermosetting resin are wound onto a mandrel. The method disclosed progressively feeds the slurry onto the mandrel to produce a layer of the slurry, whilst at the same time winding a layer of dry glass fibre tow onto the slurry layer with an open structure. The openings in the open structure are filled with slurry so that the glass fibre tow traps a layer of MLC slurry, squeezing it to produce the required resin level. The excess resin in the MLC slurry is used to impregnate the glass fibre tow to produce the desired structure. The wound structure is then gelled and cured whilst on the mandrel.

Such a method of manufacturing an MLC rotor relies on the mobility of the resin and the NdFeB's powder slurry to flow in order to produce the required structure.

The ability to flow prevents the adoption of procedures required to enable gains in remanence flux associated with current anisotropic NdFeB particulates to be gained because the particulate tends to clump around the poles of the orientation magnets.

Such clumping causes imbalance which is detrimental in a high speed flywheel and can lead to the destruction of the rotor and stator assembly.

The difficulty associated with such a known method is at least partially mitigated in the disclosure of PCT/GB2012/051367.

In this reference, a magnetically loaded pre-impregnated tape impregnates a fibre tape material with a thermoplastic solution and also with a solvent-doped anisotropic magnetic particle material.

A rotor is formed by winding the magnetically loaded pre-impregnated tape and a thermoplastic resin impregnated fibre tow onto a mandrel at a heating station, and applying heat at the heating station to bond the tow and the tape.

It will be appreciated that such rotors, to be commercially viable, must be manufactured with reasonable production speed and to a very high accuracy. The mandrel is required to be reusable so that, after forming the rotor and curing the rotor, it must be slid off the mandrel.

The powdered magnetic material is hard and highly abrasive and during the manufacturing process tends to work through to the radially inner surface of the rotor and, thus, abrades the mandrel hindering the removal of the cured MLC rotor from the mandrel. It, thus, requires a significant force to remove the cured MLC rotor from the mandrel with the potentiality of damaging the innermost cured layer that was adjacent to the mandrel, as well as damaging the finish of the mandrel. In an attempt to mitigate the foregoing disadvantage in EP-B-067987, a pre-impregnated glass fibre tow was wound onto the mandrel prior to winding the MLC rotor. However, some of the magnetic material powder still migrates through the glass fibre tow onto the surface of the mandrel where it hinders the removal of the rotor.

Even though it has been found expedient to coat the mandrel with a release agent layer prior to winding the fore-noted glass fibre tow, such a release agent layer tends to be scratched by the magnetic particles, as is the mandrel itself.

Furthermore, it has been found that micro-cracks propagate from the inner surface of the rotor and these micro-cracks are believed to be at least partly caused by the forces acting upon the material, both resin and glass fibre, and particles of magnetic material causing them to flow across the inner surface of the rotor.

The present invention seeks to at least partially mitigate the foregoing problems.

According to a first aspect of this invention there is provided a method of making a rotor of fibre reinforced plastics material including the steps of:
(a) providing a rotatable mandrel having a longitudinal axis
(b) applying a release agent to said mandrel
(c) applying fibre material to the mandrel over said release agent, said fibre material having fibres extending in the direction of said longitudinal axis, and
(d) providing a magnetically loaded tow, including magnetic particles, over said fibre material, wherein the fibre material is applied so that the magnetic particles do not substantially penetrate therethrough to the mandrel.

Preferably, the fibre material is woven and is one of plain weave, mock leno weave, four harness satin weave, eight harness satin weave, and twill weave.

Alternatively the fibre material is non-woven fabric, felt or mat consisting of at least fibres arranged in the longitudinal axis direction.

Conveniently, the fibre material is made of resin pre-impregnated glass or carbon fibre cloth, fabric, felt or mat.

In one embodiment, the step (d) includes supplying plural layers of a multi-filament glass tow or tape, and a mixture of resin and magnetic particles to said fibre material, and a doctor plate is arranged to force said mixture of resin and magnetic particles toward the fibre material, but not therethrough, and between each of said plural layers of the multi-filament glass tow.

Conveniently, the glass tow has a width less than the axial length of the fibre material on the mandrel and is wound in the direction of said longitudinal axis.

In another embodiment, step (d) includes the further steps of winding at least one intermediate layer comprising resin impregnated fibres about the fibre material so as to define spaces between the fibres of the intermediate layer; disposing a mixture comprising magnetic filler material and a resin matrix material in the spaces; winding an outer layer comprising resin impregnated fibres about the intermediate layers; applying a magnetic field to align the magnetic filler material in a required orientation whilst the resin is in the liquid state prior to gelling, during the gelling process; curing the resin; and magnetising the magnetic material.

In a further embodiment, step (d) includes the steps of impregnating a fibre tape material with a thermoplastic resin solution and with a solvent-doped anisotropic magnetic material to form a magnetically loaded pre-impregnated tape, feeding the anisotropic magnetically loaded pre-impregnated tape and a thermoplastic resin impregnated fibre tow to a heating station, applying heat at said heating station to bond said tow and the tape so as to produce a magnetically loaded composite tape, winding the magnetically loaded composite tape upon a magnetically energised mandrel to align the anisotropic magnetic particle material prior to magnetisation with a desired magnetic configuration.

According to a feature of this invention there is provided a magnetically loaded composite rotor made in accordance with the first aspect.

According to a second aspect of this invention there is provided a magnetically loaded composite rotor comprising a resin pre-impregnated fibre material said fibre material having fibres extending in a longitudinal axial direction coated with plural layers of magnetically loaded tow or tape.

Figure 2:
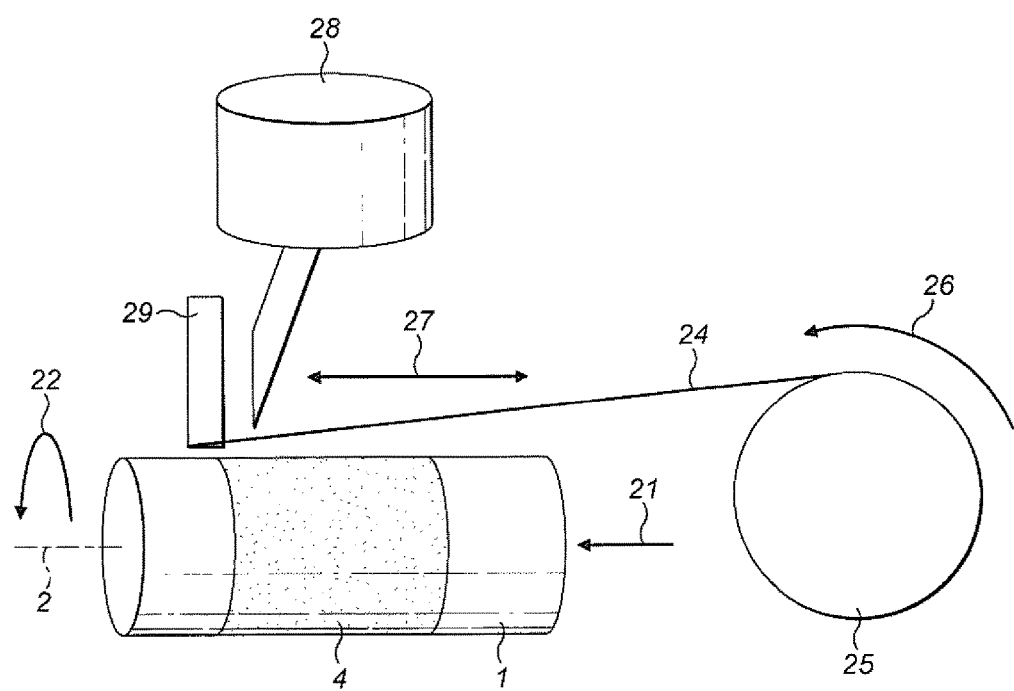
Figure 3:
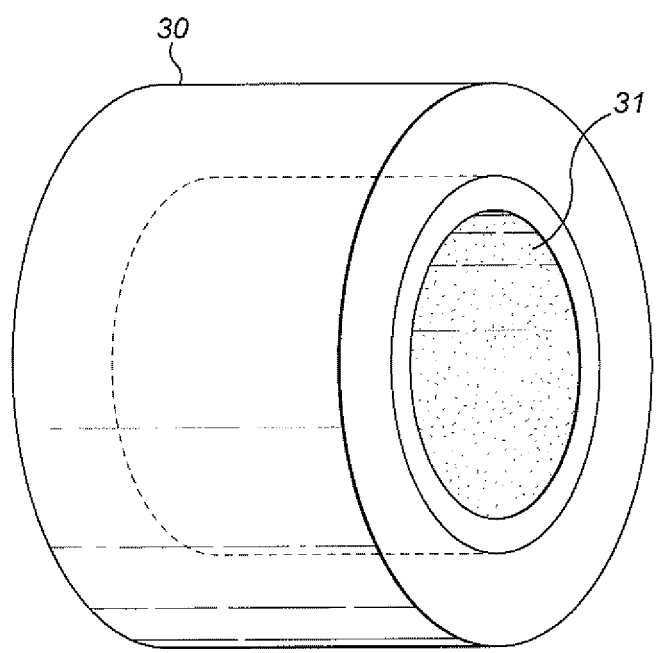
Figure 4:
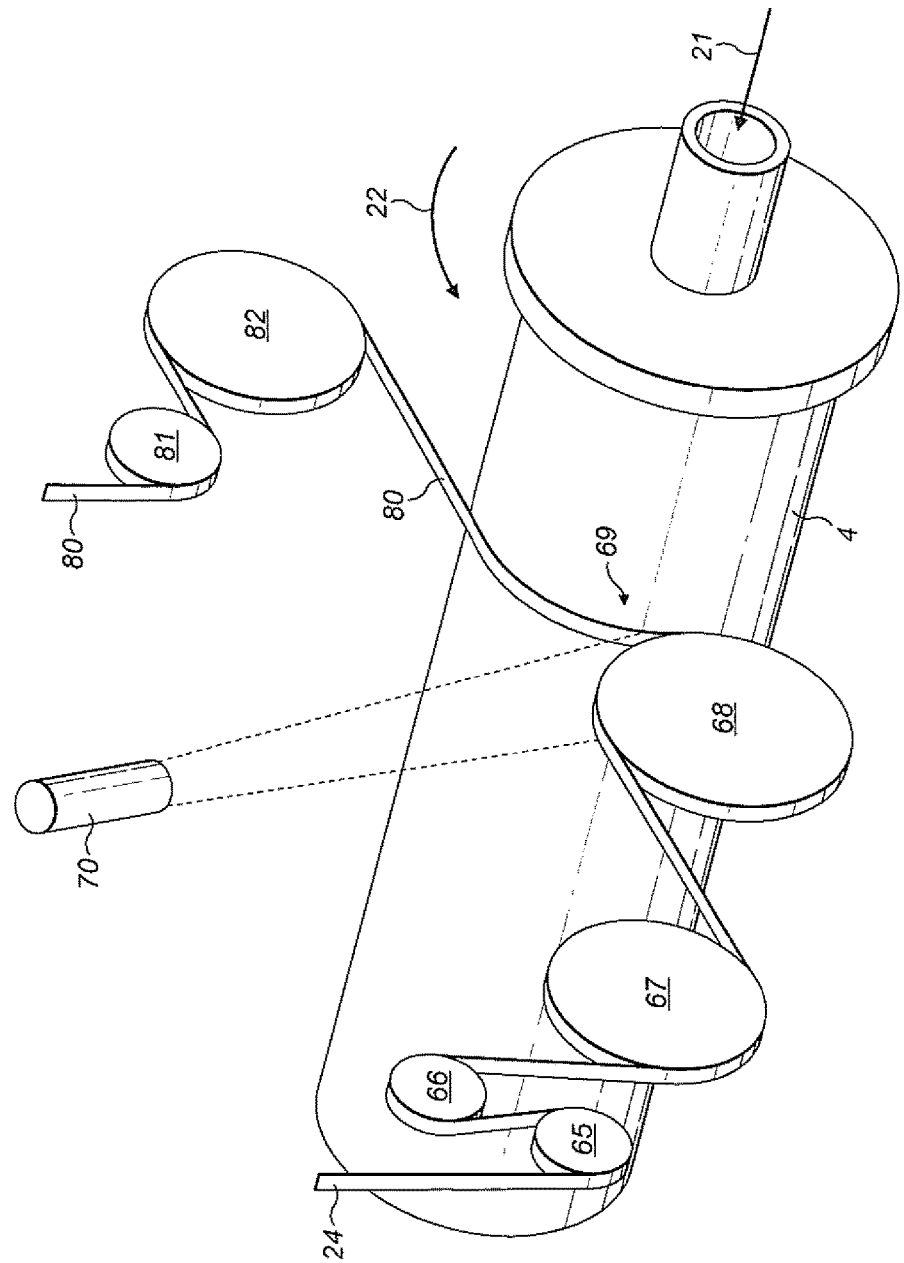

The invention will now be described, by way of example, with reference to the accompanying drawings, in which:

FIG. 1 shows, in schematic form, a perspective view of a mandrel formed with a first layer of fibre material in accordance with this invention, FIG. 2 shows, in schematic form, an apparatus for forming a magnetically loaded composite rotor, FIG. 3 shows a rotor made in accordance with this invention, and FIG. 4 shows a further apparatus for manufacturing a magnetically loaded composite tape.

In the Figures like reference numerals denote like parts.

In FIG. 1, a cylindrical, hollow, mandrel 1, upon which a rotor is to be formed, has a longitudinally extending axis 2. At least a portion of the outer surface of the mandrel is coated in a commercially available release agent 3, which may be a wax, polyvinyl alcohol or any commercially available release agent such as FibRelease® available from www.fibreglast.com. Coated on top of the release agent is at least one layer of fibre material 4, preferably a pre-impregnated glass fibre cloth material, having fibres which extend in the direction of the longitudinal axis 2.

The fibre material may alternatively be a non-woven cloth, felt or mat or a stitched cloth.

The pre-impregnated glass fibre cloth is naturally sticky and is pre-cut and rolled onto the surface of the mandrel and then heat cured.

Further examples of the woven material may be:

Plain Weave

In this weave pattern, warp and fill yarns are interlaced over and under each other in alternating fashion. The plain weave produces good stability, porosity and the least yarn slippage for a given yarn count.

Mock Leno Weave

Mock leno weave is used where relatively low numbers of yarns are desired. The mock leno weave locks the yarns in place by crossing two or more warp threads over each other and interlacing with one or more filling threads.

Four Harness Satin (Crowfoot) Weave

The four harness satin weave is more pliable than the plain weave and is easier to conform to curved surfaces typical in reinforced plastics. In this weave pattern there is a 3×1 interfacing where a filling yarn floats over three warp yarns and under one warp yarn.

Eight Harness Satin Weave

This weave pattern is similar to the four harness satin weave except that one filling yarn floats over seven warp yarns and under one warp yarn. This weave is very pliable and may be used for forming over curved surfaces.

Twill Weave

Twill weave is more pliable than plain weave and has better drape ability while maintaining more fabric stability than a four or eight harness satin weave. The weave pattern is characterised by a diagonal rib created by one warp yarn floating over at least two filling yarns.

The fibre material initially applied to the mandrel, in this example may preferably not be electrically conductive and is, preferably, woven and pre-impregnated with resin and applied to the mandrel with the warp or wefts extending in the direction of the longitudinal axis 2.

Importantly the pre-impregnated fibre material has a resistance to powder penetration such that magnetic particulate material subsequently applied (as described herein hereafter) does not migrate through the fibre material onto the surface of the release agent 3.

FIG. 2 shows, in simplified schematic form, an apparatus for forming an MLC rotor. The mandrel is driven by a motor (not shown). The mandrel may be heated by a convenient source (not shown) which may provide an internal portion of the cylinder with hot air, shown by arrow headed line 21. The mandrel 1 is mounted on a winding machine (not shown) and the mandrel is arranged to be rotated in the direction of arrow-headed line 22. A thermoplastic resin impregnated tow 24 is supplied from a drum 25 rotatable in the direction of arrow-headed line 26. The tow material 24 has multi-filaments of between 1,000 and 3,000, preferably 2.400, strands. The tow 24 has a width which is less than the axial length of the fibre material 4 on the mandrel and is arranged to be wound back and forth in the direction of the longitudinal axis 2, as shown by double arrow-headed line 27. A container 28 holds a mixture of resin and anisotropic NdFeB particulate material that may also include a solvent and polyetheretherketone (PEAK) and polyetherimide (PEI) heated to a temperature of between 60° C. and 100° C. The mixture of resin and magnetic particles from container 28 is applied to the tow 24.

A doctor or scraper blade 29 rests upon the tow and is mounted such that as the diameter of the tow surface increases, so the blade is raised. Thus, the doctor blade 29 acts as a squeegee to force the resin and magnetic particles into the tow and between each tow wrap. The tow and doctor blade are moved in the direction of the double arrow-headed line 27 to build up a rotor of suitable thickness.

A rotor made in accordance with the present method is shown in FIG. 3. The MLC rotor 30 has at least a first radially internal layer 31 of fibre material made, for example, of pre-impregnated woven cloth.

In this invention, the fibre material acts as a tie layer, preventing axial creep of the tow 24 when the rotor is operational and working under G-forces of approaching 250,000 g.

FIG. 2 shows one apparatus for making a rotor, but the rotor may be manufactured using other methods, the common factor being the provision of the axially reinforced innermost layer of fibre material 4.

Thus, a mandrel having a release agent and an inner layer of fibre material is provided as described with reference to FIG. 1 hereinabove and the apparatus may be as described in EP-B-067987. Tows of carbon or glass fibres impregnated with uncured epoxy resin are wound onto the inner fibre material 4.

Intermediate layers of tows of carbon fibres impregnated with uncured epoxy resin are wound onto the fibre material 4 with a 180° out of phase relationship to one another. Spaces between the tows are filled with magnetic particulate material in a de-magnetised state, and with uncured epoxy resin. An outer layer of tows of fibre impregnated with uncured epoxy resin is wound onto the fore-noted intermediate layers of tows. An outer shell is formed in a similar manner and a magnetic field is applied so as to align the magnetic particulate material. The epoxy resin is cured in an appropriate heating environment.

In a further arrangement, the mandrel is provided, as described above, with reference to FIG. 1. The apparatus for forming the rotor is then substantially the same as that described in PCT/GB2012/051367. Thus, referring to FIG. 4, the thermoplastic resin impregnated tow 24 is fed over pre-tensioning rollers 65, 66, 67 to a compaction and guide roller 68 located at a heating station 69.

The heating station 69 is supplied with heating energy from a laser 70, which may be a 2 kw laser providing pulsed or continuous energy at a temperature of 350° C. to 400° C. at the heating station 69. Also supplied to the heating station 69 is a magnetically loaded pre-impregnated tape 80, which is fed over tensioning rollers 81, 82. The tow 24 and tape 80, together with the heating station 69, is moved longitudinally in the longitudinal axis direction of the mandrel to form a MLC rotor. After formation, stress relief may be performed by heating the rotor in an oven to 300° C.

The present invention, by providing an internal layer of fibre material orientated as described upon which the MLC rotor is formed, facilitates removal of the rotor from the mandrel and, moreover, prevents axial creep of the MLC rotor layers and, hence, prevents radial cracking from the inner surface of the rotor. Such a feature has the effect of significantly enhancing the fatigue life of the MLC rotor.

The invention claimed is:

1. A method of making a rotor of fibre reinforced plastics material including the steps of:
   (a) providing a rotatable mandrel having a longitudinal axis
   (b) applying a release agent to said mandrel
   (c) applying fibre material to the mandrel over said release agent, said fibre material having fibres extending in the direction of said longitudinal axis, and
   (d) supplying plural layers of a multi-filament glass tow or tape, and a mixture of resin and magnetic articles to said fibre material, and a doctor plate arranged to force said mixture of resin and magnetic particles toward the fibre material, but not therethrough, and between each of said plural layers of the multi-filament glass tow, wherein the glass tow has a width less than the axial length of the fibre material on the mandrel and is wound in the direction of said longitudinal axis.

2. A method as claimed in claim 1, wherein the fibre material is woven and is one of plain weave, mock leno weave, four harness satin weave, eight harness satin weave, and twill weave.

3. A method as claimed in claim 1, wherein the fibre material is non woven fabric, felt or mat consisting of at least fibres arranged in the longitudinal axis direction.

4. A method as claimed in claim 1, wherein the fibre material is made of resin pre-impregnated glass or carbon fibre cloth, fabric, felt or mat.

5. A method as claimed in claim 1, wherein step (d) includes the further steps of winding at least one intermediate layer comprising resin impregnated fibres about the fibre material so as to define spaces between the fibres of the intermediate layer; disposing a mixture comprising magnetic filler material and a resin matrix material in the spaces; winding an outer layer comprising resin impregnated fibres about the intermediate layers; applying a magnetic field to align the magnetic filler material in a required orientation whilst the resin is in the liquid state prior to gelling, during the gelling process; curing the resin; and magnetising the magnetic material.

6. A method as claimed in claim 1, wherein step (d) includes the steps of impregnating a fibre tape material with a thermoplastic resin solution and with a solvent-doped anisotropic magnetic material to form a magnetically loaded pre-impregnated tape, feeding the anisotropic magnetically loaded pre-impregnated tape and a thermoplastic resin impregnated fibre tow to a heating station, applying heat at said heating station to bond said tow and the tape so as to produce a magnetically loaded composite tape, winding the magnetically loaded composite tape upon a magnetically energised mandrel to align the anisotropic magnetic particle material prior to magnetisation with a desired magnetic configuration.

7. A magnetically loaded composite rotor made in accordance with claim 1.

* * * * *